R. C. MENERAY.
STAY FOR PLANTS.
APPLICATION FILED JUNE 27, 1907.
926,274.
Patented June 29, 1909.
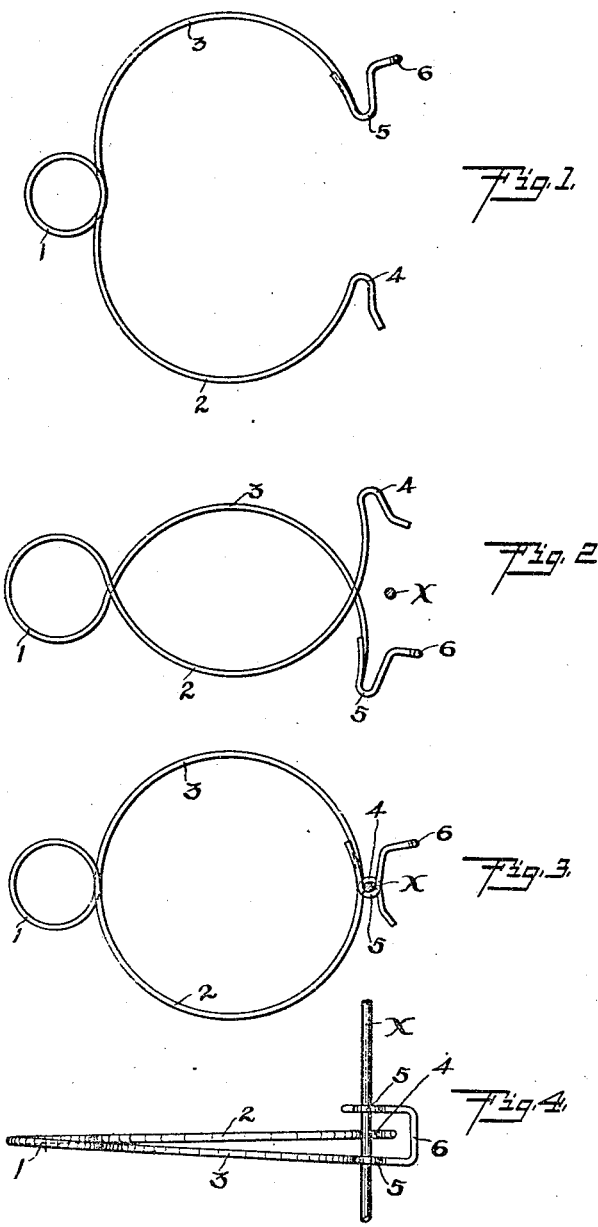
Witnesses:
D. O. Barnell
H. J. Cashro
Inventor
Roscoe C. Meneray

UNITED STATES PATENT OFFICE.

ROSCOE C. MENERAY, OF COUNCIL BLUFFS, IOWA.

STAY FOR PLANTS.

No. 926,274.          Specification of Letters Patent.          Patented June 29, 1909.

Application filed June 27, 1907. Serial No. 381,144.

*To all whom it may concern:*

Be it known that I, ROSCOE C. MENERAY, a citizen of the United States, residing at 208 Stutsman street, in the city of Council Bluffs, in the county of Pottawattamie and State of Iowa, have invented certain new and useful Improvements in Stays for Plants, of which the following is a specification.

The principal object of this invention is to provide convenient, economical means as an aid to the nurseryman for supporting plants in an erect position. While young and tender plants are growing they should be supported in an upright position, the means generally employed being to insert a stake in the ground near the plant, and manually secure the plant to the stake, as by use of twine, and the labor required to accomplish this is an item of considerable expense to the plant grower, and wood material for the stakes is expensive. As the plant grows, an adjustment must be made of the twine, which requires much loss of time.

The present invention describes a device for reliably supporting the plant, which may be readily moved upward any desired height, and which dispenses with the use of wood material for the stake and makes possible the use of a wire post or prop.

The invention provides compressible sustaining arms having ample space between them for a limited movement of the plant, so that the plant will not be injured or its circulation be impaired, as often is the case where twine is used to secure it.

Another object is the provision of a construction whereby the device may be diminutive in size for use in connection with the younger class of plants, a small loop being introduced to relieve the strain coming upon the sustaining-arms, and which permits operative use by manual manipulation.

Figure 1 is a plan view of the compression member, when in a normal position. Fig. 2 is a plan view of the complete invention, the resilient sustaining-arms being in a compressed position, with the engaging-hooks out of contact with the prop or post, said post being in section. Fig. 3 is a somewhat similar view of the parts shown in Fig. 2, the engaging-hooks being in contact with the post, this being a plan and operative view of the device. Fig. 4 is a side view of the parts shown in Fig. 3, the post being broken away.

Referring now to the drawing for a more particular description, I provide the compression-member comprising the parts shown in Fig. 1, preferably using therefor a resilient metal strand, forming the reinforcing-loop 1 intermediate and preferably midway between the terminals of sustaining-arms 2 and 3, said arms 2 and 3 being outwardly curved between their junction with the loop and their ends, and oppositely-disposed with reference to each other.

Upon the terminal of arm 2 is provided the hook 4, and at or near the end of arm 3 are formed hooks 5, said hooks 5 being disposed and held adjacent each other by the connecting portion 6. As thus described arms 2 and 3 may be manually compressed, hook 4 passing through hooks 5 inside of portion 6.

In operation I employ a prop or holding-post *x*, preferably a straight piece of wire, with its lower end inserted in the soil near the growing plant, and after arms 2 and 3 are disposed horizontally, they are compressed to the position shown in Fig. 2, at which time they encircle the growing plant; upon relaxing the compression upon arms 2 and 3 they assume the position shown in Figs. 3 and 4, whereby hooks 5 and hook 4 engage the upright post *x*, and the degree of resiliency of arms 2 and 3 is sufficient to hold the hooks firmly upon said post; thereafter, when it is desired to elevate the arms, it may quickly be accomplished by manually compressing said arms, and this will loosen the hold of hooks 5 and hook 4 upon the post.

It will be appreciated by nurserymen that much time is saved by use of the device; by use of the resilient arms, their hooks may be secured at any desired elevation upon the body of the upright, and the post may be smooth or rough and the hooks will be equally operative, as is obvious, whereas it is considered that twine could not be reliably used in connection with the post as herein described. The device may be very economically constructed, and the parts are durable.

Having fully described the several parts and operation, what I claim as new and desire to secure by Letters Patent of the United States is,—

A device of the character described comprising a spring loop and side members 3 and 4, said loop being adapted to encircle a plant, one of said side members terminating in a hook which lies in substantially the same plane as said members, said hook terminating in a rearward extension and the other of said side members being bent upon itself to form a hook 5, then bent rearwardly and upwardly to form a rearward extension 6 and being then bent to form a second hook 5, the extension 6 and the rearward extension of the first named hook forming finger grips, the first named hook being adapted to pass between the last named hooks.

In testimony whereof, I have signed my name to this specification in the presence of two witnesses.

ROSCOE C. MENERAY.

Witnesses:
W. W. SLABAUGH,
MARIE K. BOWES.